May 21, 1929. A. C. HOPKINS 1,713,871
TIRE BEAD REENFORCING ELEMENT
Filed Feb. 25, 1927
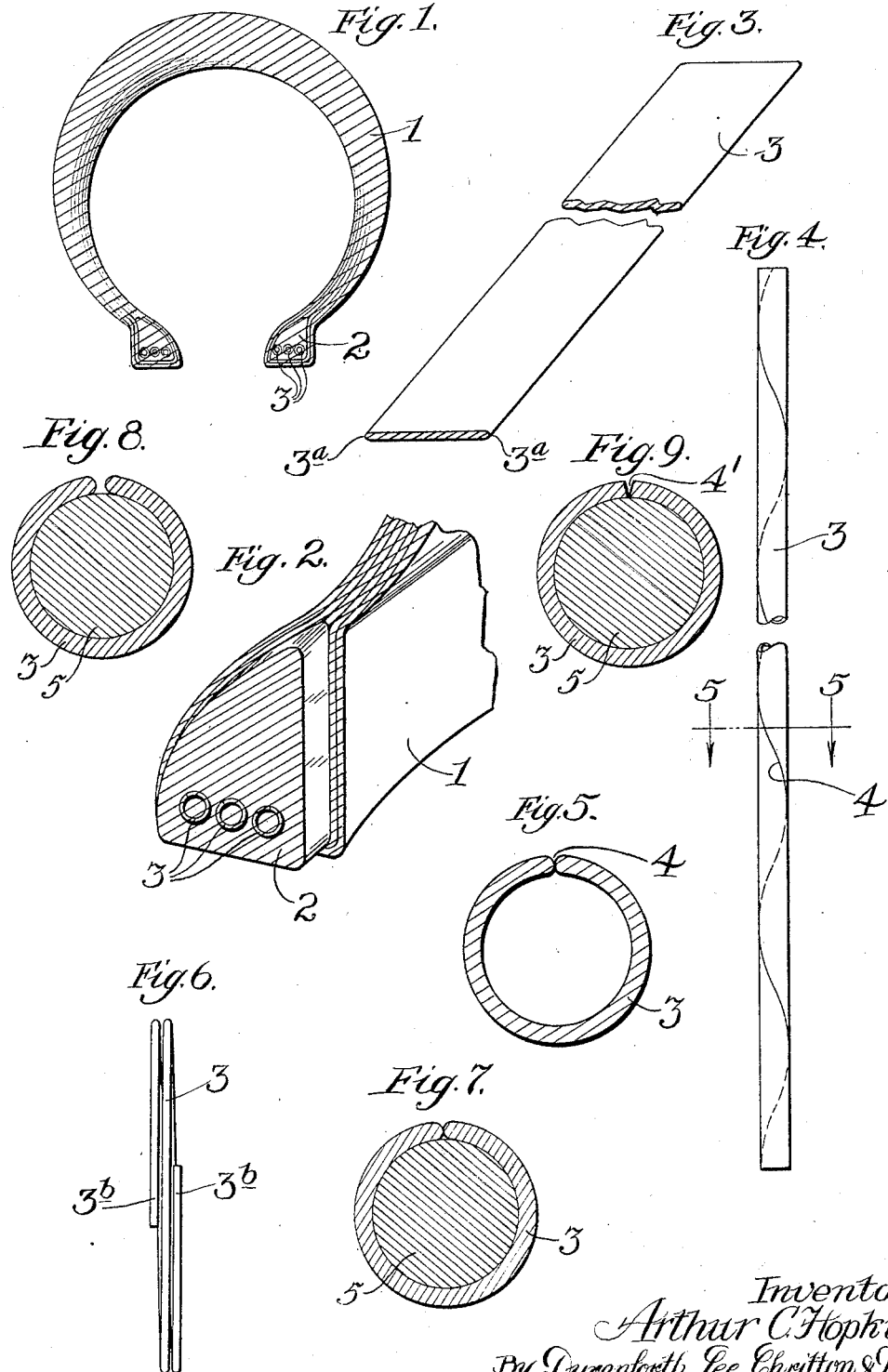
Inventor:
Arthur C Hopkins.
By Dyrenforth, Lee, Chritton & Wiles.
Attys.

Patented May 21, 1929.

1,713,871

UNITED STATES PATENT OFFICE.

ARTHUR C. HOPKINS, OF NILES, MICHIGAN, ASSIGNOR TO NATIONAL STANDARD COMPANY, A CORPORATION OF MICHIGAN.

TIRE-BEAD REENFORCING ELEMENT.

Application filed February 25, 1927. Serial No. 170,974.

This invention relates to improvements in tire-bead reenforcing elements, and more especially to a bead for pneumatic tires and a reenforcing element adapted for use therein.

Among the features of my invention is the provision of a tire bead provided with a reenforcement which may be easily and cheaply manufactured, and which is substantially non-stretchable. The reenforcement or reenforcing element is also so constructed that it may easily be conformed to the curvature of the tire bead without weakening the same. The reenforcing element in my improved bead is also so constructed that when embedded in the bead, the rubber composition or other material of which the bead may be composed adheres to the same, the bead proper and the reenforcing element becoming interlocked to make a substantially unitary structure. Other features and advantages of my invention will appear more fully as I proceed with my specification.

In that form of device embodying the features of my invention, Fig. 1 is a vertical sectional view of a tire, Fig. 2 is an enlarged perspective view of a portion of the bead, Fig. 3 is an enlarged perspective view of a portion of the metal tape or ribbon used in forming the reenforcing element, Fig. 4 is a top plan view of the reenforcing element showing the same after it has been formed and before incorporated in the bead, Fig. 5 is a view on an enlarged scale taken as indicated by the line 5—5 of Fig. 4, Fig. 6 is a diagrammatical view showing the shape of the reenforcing element after it is embedded in the tire bead, Fig. 7 is a view similar to Fig. 5 showing a modified form in which the strip or ribbon of metal 3 is wound on the core 5, and Figs. 8 and 9 are views similar to Fig. 7.

As shown in the drawings, 1 indicates a conventional tire casing provided with the usual bead 2, which is formed of a suitable rubber composition, the bead being of a cross-section corresponding to the tire in which it is desired to use the same, and here shown as substantially triangular in shape.

Embedded in the bead proper 2 is a reenforcement, or reenforcing element, formed by a single strip or ribbon of metal 3, spirally wound into tubular form in a rather long spiral as shown in Fig. 4. This strip should be wound in a spiral long enough so that the adjacent edges contact, thus giving it tensile strength. That is, the spiral should be so formed and long enough, so that with the adjacent edges in contact, a pull or stretch on the element causes these edges to press together rather than separate. When thus wound, the element will have tensile strength and will not act like a spiral spring, the turns or convolutions of which tend to separate when the same is pulled.

The strip 3 may be of metal or similar material, and should be made of material and have dimensions to give it the requisite tensile strength. The kind of material used and the dimensions obviously will depend to a certain extent upon the size and shape of tire in the bead of which the element is to be used. I have found, for example, that in a five or six inch automobile tire as is now commonly used on passenger cars, the strip may be made out of steel tape substantially one-half inch wide and .025 inch thick. When such a tape is wound in a rather long spiral, with one wind or convolution thereof to every 1½ or 2 inches, so that the opposite or adjacent edges thereof are in contact, it will be found that any pull or stretch on the element causes the contacting edges to press more tightly together thus giving the element tensile strength and making it substantially non-stretchable. In Fig. 4 I have shown tape wound as indicated.

The edges of the steel tape are preferably rounded as indicated by $3^a$, so that when they are in contact the element will have on its outer surface a substantially V-shaped groove or depression 4. This groove or depression becomes filled with the rubber composition of which the bead is formed, thus causing the bead to adhere to the element and interlocking the same therewith to form a substantially unitary structure. In all probability, the adjacent edges of the tape will not contact at all points to form a perfect seal, and consequently, the interior of the tape after being wound in its tubular form will become filled with the rubber composition thus increasing the interlock. It is not necessary, however, in the practice of my invention, that the inside become thus filled with the rubber composition.

In the manufacture of the tire bead, the reenforcing element in its final form, as shown in Fig. 4, is convolutely disposed and embedded in the tire bead, a sufficient number of convolutions or wraps of the element being formed to give the requisite reenforcement to the bead, and these convolutions or wraps may be disposed within the bead as desired. For example, in case the bead has a triangular cross-section, as shown in Figs. 1 and 2, there may be two convolutions of the reenforcing element, side by side, with the ends thereof overlapping as shown in Fig. 6 and indicated by 3ᵇ. The cut through the bead shown in Fig. 2 represents the cut taken through these overlapping ends, consequently showing three sections of the reenforcing element.

In the form shown in Fig. 7 the strip or ribbon of metal 3 is wound on a core 5 which may be of any suitable material such as, for example, wire. Soft iron wire may be used for such a core or filler, or material such as cord, string, fiber, or the like could be used. A metal wire would give better support to the strip than a softer material. The use of such a core 5 will assist in forming the tape 3 into its tubular form as the tape may be wound about the core. When disposed in the tire bead, such a core itself would add to the tensile strength of the element and also offer a resistance to the closing in of the wraps of the tape about it as a pull is put upon the element.

Although I have stated that the edges of the tape after being wound in the tubular form are in contact, I do not mean by this that they must be in continuous contact throughout their length. It is obvious that in bending the element in the form shown in Fig. 6 these edges may move out of contact at various places. All that is necessary is that the edges be in contact sufficiently to brace each other and thus prevent stretching of the reenforcing element.

It should be added that ordinarily the reenforcing element is introduced into the tire-bead in the process of manufacturing the tire, and thus the reenforcing element is embedded and vulcanized in the rubber ordinarily employed in connection with suitable plies of fabric in the formation of the tire-beads. Also, it will be understood that the spiral annulus shown in Fig. 6 is, after being vulcanized within the tire-bead, concentric with the inner circumferential surface thereof. In practice, the reenforcing element may be supplied to the tire-manufacturer in any desired length and then wound into annular form in the building-up of the tire-bead as desired; or, if preferred, the reenforcement, in the form shown in Fig. 6, may be introduced into the bead during the building-up thereof.

It is a highly desirable feature in the manufacture of the spirally wound tubular strip itself that the winding be done under sufficient stretching to produce a long spiral and a small cross-sectional area, thus making the spirally wound ribbon capable of withstanding comparatively heavy tension. Also, it is preferable to employ a thin pliable ribbon of moderate stiffness only and capable of taking a set readily, so that the ribbon will remain in the spirally-wound condition with the edges in substantial contact without the necessity of welding the edge-portions together.

While I have shown and described certain embodiments of my invention, it is to be understood that it is capable of many modifications. Changes, therefore, in the construction and arrangement may be made without departing from the spirit and scope of the invention as disclosed in the appended claims, in which is is my intention to claim all novelty inherent in my invention as broadly as possible in view of the prior art.

In Fig. 8 I have shown a form of element similar to that illustrated in Fig. 7, except that as shown in Fig. 8 the strip or ribbon of metal 3 is wound on the core 5 so that its edges are slightly out of contact.

In Fig. 9 I have shown the strip or ribbon of metal 3 provided with square edges instead of having them rounded. In the device shown in Fig. 9 the strip 3 is also wound on a core 5, but it could be wound as indicated in Fig. 5, without a core. Where the edges are square, as in the case of the strip illustrated in Fig. 9, it will be seen that there is a V-shaped groove 4' formed where these edges contact, similar to the groove or depression 4 illustrated in Fig. 5. This groove or depression becomes filled with the rubber composition of which the bead is formed, thus causing the bead to adhere to the element and interlocking the same therewith to form a substantially unitary structure.

It might also be stated that the long spiral referred to is a spiral with its spirals of steep pitch. That is, the element itself might be referred to as a strip wound into a spiraled tube with its spirals of steep pitch.

What I claim as new, and desire to secure by Letters Patent, is:

1. A tire-bead reenforcing element consisting of a strip or ribbon of metal wound into a long spiral tubular in form with the adjacent edges thereof in contact, the outer corners of the edges of said strip being substantially rounded to form a spiral substantially V-shaped groove or depression on the outer surface of said element after being wound in its tubular form.

2. A tire-bead reenforcing element consisting of a core having a substantially circular cross-section, and a strip or ribbon of metal wound into a long spiral tubular in form about said core.

3. A tire-bead reenforcing element consisting of a core having a substantially circular cross-section, and a strip or ribbon of metal wound into a long spiral tubular in form about said core, with the edge portions thereof in substantially continuous contact.

4. A tire-bead reenforcing element consisting of a core having a substantially circular cross-section, and a strip or ribbon of metal wound into a long spiral tubular in form about said core, the spirals of said strip or ribbon of metal mutually bracing each other.

5. A tire-bead reenforcing element consisting of a core having a substantially circular cross-section, and a strip or ribbon of metal spirally wound about said core.

6. A tire-bead reenforcing element consisting of a strip or ribbon of metal wound into a long spiral tubular in form with the adjacent edges thereof in contact, said edges being out of contact adjacent the outer wall, whereby there is formed a V-shaped groove or depression where said edges contact.

7. A tire-bead reenforcing element consisting of a strip or ribbon of metal wound into a long spiral tubular in form with the adjacent edges thereof in substantially continuous contact, said edges being out of contact adjacent the outer wall, whereby there is formed a V-shaped groove or depression where said edges contact.

8. A tire-bead reenforcing element consisting of a strip or ribbon of metal wound into a spiral tube with its spirals of steep pitch with the adjacent edges thereof in contact and adapted to be pressed toward each other by tension on the spiral to make the element substantially non-stretchable.

9. A tire-bead reenforcing element consisting of a strip or ribbon of metal with rounded edges, wound into a spiraled tube with its spirals of steep pitch with the adjacent edges mutually bracing each other and adapted to be pressed towards each other by tension on the spiral to make the element substantially non-stretchable.

10. A tire-bead reenforcing element consisting of a strip or ribbon of metal wound into a spiraled tube with its spirals of steep pitch with the adjacent edges thereof in substantially continuous contact and adapted to be pressed toward each other by tension on the spiral to make the element substantially non-stretchable.

11. A tire-bead reenforcing element consisting of a flexible strip or ribbon of metal capable of taking a set, said strip or ribbon of metal wound into a spiraled tube with its spirals of steep pitch with the adjacent edges thereof in substantially continuous contact and adapted to be pressed toward each other by tension on the spiral to make the element substantially non-stretchable.

In witness whereof I have hereunto set my hand this 8th day of February, A. D. 1927.

ARTHUR C. HOPKINS.